US012808232B2

(12) United States Patent
Lee

(10) Patent No.: US 12,808,232 B2
(45) Date of Patent: Nov. 24, 2026

(54) PUSH-PULL DOOR LOCK HAVING ANTI-PANIC FUNCTION

(71) Applicant: ANYLOCK CO., LTD., Incheon (KR)

(72) Inventor: Hyun Jin Lee, Siheung-si (KR)

(73) Assignee: ANYLOCK CO., LTD. (KR)

( * ) Notice: Subject to any disclaimer, the term of this patent is extended or adjusted under 35 U.S.C. 154(b) by 15 days.

(21) Appl. No.: 18/691,022

(22) PCT Filed: Dec. 9, 2021

(86) PCT No.: PCT/KR2021/018603
§ 371 (c)(1),
(2) Date: Mar. 11, 2024

(87) PCT Pub. No.: WO2023/042966
PCT Pub. Date: Mar. 23, 2023

(65) Prior Publication Data

US 2024/0384569 A1 Nov. 21, 2024

(30) Foreign Application Priority Data

Sep. 14, 2021 (KR) ........................ 10-2021-0122646

(51) Int. Cl.
*E05B 63/22* (2006.01)
*E05B 1/00* (2006.01)

(52) U.S. Cl.
CPC ...... *E05B 63/22* (2013.01); *E05B 2001/0076* (2013.01)

(58) Field of Classification Search
CPC ......................... E05B 2001/0076; E05B 63/22
See application file for complete search history.

(56) References Cited

U.S. PATENT DOCUMENTS 1,618,344 A * 2/1927 Kopp ........................ E05C 1/14
70/489
2,167,594 A * 7/1939 Stratman ................. E05B 63/22
292/196

(Continued)

FOREIGN PATENT DOCUMENTS

JP 2007016391 A 1/2007
KR 20110096741 A 8/2011

(Continued)

OTHER PUBLICATIONS

International Search Report for PCT/KR2021/018603, mailed May 24, 2022.

*Primary Examiner* — Christopher J Boswell
(74) *Attorney, Agent, or Firm* — Renaissance IP Law Group LLP

(57) ABSTRACT

The present inventive concept relates to a push-pull door lock having an anti-panic function, the push-pull door lock comprising: a door locking device which is provided inside a door and opens/closes the door; a handle device comprising bodies fixedly provided on the indoor side and the outdoor side of the door, and handles which are respectively provided on the bodies to be pushed or pulled; and a locking means which is provided in each of the bodies of the handle device and locks the operation of the handle to lock the door, wherein the locking means comprises: a key knob assembly which is rotatably provided in the indoor side body; a key assembly which is rotatably provided in the outdoor side body and is connected to the key knob assembly to be rotated along with the key knob assembly; and a stopper which is connected to the key assembly, is rotated along with the key assembly, and locks the operation of the handle. The locking means includes guide plates which are provided on the indoor side and outdoor side bodies and are moved up and down on the bodies by push and pull operations of the (Continued)

indoor side and outdoor side handles. The outdoor side guide plate has a through-hole through which the stopper passes to be rotatable and to which the stopper is coupled after being rotated so as to stop the moving-up/down operation of the guide plate during locking of the locking means. The key knob assembly passes through the indoor side guide plate to be rotatable, and is rotated when the guide plates are moved up and down.

6 Claims, 10 Drawing Sheets

(56) References Cited

U.S. PATENT DOCUMENTS

| | | | | | |
|---|---|---|---|---|---|
| 2,895,322 | A * | 7/1959 | Pollock | E05B 55/00 70/153 |
| 5,403,047 | A * | 4/1995 | Walls | E05B 63/0069 292/336.3 |
| 6,293,598 | B1 * | 9/2001 | Rusiana | E05C 1/14 70/91 |
| 9,200,472 | B2 * | 12/2015 | Lee | E05B 63/22 |
| 12,286,812 | B2 * | 4/2025 | Lee | E05B 13/10 |
| 2014/0246872 | A1 * | 9/2014 | Shen | E05B 7/00 292/336.3 |
| 2025/0052093 | A1 * | 2/2025 | Lee | E05B 63/08 |

FOREIGN PATENT DOCUMENTS

| | | | |
|---|---|---|---|
| KR | 102141548 | B1 | 8/2020 |
| KR | 20200123755 | A | 10/2020 |
| KR | 20200126861 | A | 11/2020 |
| KR | 20210079011 | A | 6/2021 |

* cited by examiner

PUSH-PULL DOOR LOCK HAVING ANTI-PANIC FUNCTION

TECHNICAL FIELD

The present disclosure relates to a push-pull door lock, and more specifically, to a push-pull door lock having an anti-panic function that automatically releases the lock when an indoor side handle of a door lock is operated even in a state in which the door lock is locked.

BACKGROUND ART

In general, a door lock is a locking means mounted on a door to open and close the door, and digital door locks operated by mortises and keypads and handle-type door locks operated by a retaining jaw unit (locking device) and a handle unit have been widely used.

Especially, recently, in addition to the digital door locks or the handle-type door locks, push-pull door locks that lock and unlock doors by pushing or pulling push-pull handles provided on the indoor and outdoor sides of the doors have been widely used.

Although various forms of such push-pull door locks have been proposed, the push-pull door lock mainly includes handles installed on the inside and outside of the door, and a door locking device embedded in the door to lock and unlock the door. By pushing or pulling the handle according to the opening and closing direction of the door, the locking state of the door locking device is released, thereby opening the door.

Such conventional push-pull door locks have been proposed as “push/pull bidirectional push-pull door lock” in Korean Patent No. 10-2141548.

Such a conventional push-pull door lock is configured to open the door by pulling or pushing and rotating a handle body in the back-and-forth direction (vertical direction) at support parts, which are respectively installed on the inside and outside of the door. Each support includes the handle body installed to be pulled or pushed, and a structure capable of opening the door by releasing the locking state of the door locking device.

Since the operating direction of the handle body is different depending on the direction of opening the door, the operating structure of the door locking device by each handle body must also be differently provided on the indoor and outdoor sides.

In other words, in a case that the door is in a form that rotates outward to be opened, the locking device should be configured to release the locking device when the outdoor side handle body is rotated and pulled outward from the support part and the indoor side handle body is rotated and pushed from the support part. Then, the direction of opening the door matches the direction of rotation of the handle body, thereby making the use of the push-pull door lock convenient.

Furthermore, in such a push-pull door lock, when the door locking device is locked when a user rotates a key assembly outdoors or rotates a key knob indoors, the operation of the indoor and outdoor handles is locked.

However, in conventional push-pull door lock, when the door locking device is locked, it is necessary to rotate the key knob in the opposite direction indoors to release the lock. In emergencies such as fire, since it is difficult for people inside to quickly find the key knob of the push-pull door lock, the people may be in a panic state where accidents cannot be avoided.

PATENT LITERATURE

Patent Document

Korean Patent No. 10-2141548

DISCLOSURE

Technical Problem

Accordingly, the present inventive concept has been made in view of the above-mentioned problems occurring in the related art, and it is an object of the present inventive concept to provide a push-pull door lock having an anti-panic function which automatically releases a locked state when a user operates an indoor side handle indoors even in a state in which a door locking device is locked.

Technical Solution

To accomplish the above-mentioned objects, according to the present inventive concept, there is provided a push-pull door lock having an anti-panic function including: a door locking device which is provided inside a door to open and close the door; a handle device which includes bodies fixedly provided on the indoor side and the outdoor side of the door, and handles which are respectively provided on the bodies to be pushed or pulled; and a locking means which is provided in each of the bodies of the handle device and locks the operation of the handle to lock the door, wherein the locking means comprises: a key knob assembly which is rotatably provided in the indoor side body; a key assembly which is rotatably provided in the outdoor side body and is connected to the key knob assembly to be rotated along with the key knob assembly; and a stopper which is connected to the key assembly, is rotated along with the key assembly, and locks the operation of the handle, wherein the locking means includes guide plates which are respectively provided on the indoor side and outdoor side bodies and are moved up and down on the bodies by push and pull operations of the indoor side and outdoor side handles, wherein the outdoor side guide plate has a through-hole through which the stopper passes to be rotatable and to which the stopper is coupled after being rotated so as to stop the moving-up/down operation of the guide plate during locking of the locking means, and wherein the key knob assembly passes through the indoor side guide plate to be rotatable, and is rotated when the guide plates are moved up and down.

Moreover, the stopper is rectangular in shape, and has curved parts formed on both sides in the longitudinal direction and having the same circumferential surface as the arc formed during rotation of the stopper, and the through hole of the outdoor guide plate has a retaining jaw which is formed to expand in one direction arc formed on the inner circumferential surface thereof to correspond to the curved part, such that the curved part of the stopper are in surface contact and engaged with the retaining jaw of the outdoor side guide plate when the locking means is locked.

Furthermore, a retaining jaw or a stepped portion is formed in the through hole of the indoor guide plate to rotate the key knob assembly when the indoor side guide plate is raised, and a rotation protrusion which is retained and engaged with the retaining jaw or the stepped portion is formed on the key knob assembly penetrating the through hole.

Additionally, the indoor handle device includes a coupling bushing coupled to the key knob assembly, and a retaining protrusion limiting the rotation of the key knob assembly to 90 degrees is formed on the coupling bushing.

In addition, rotation plates are provided on the body to be rotatable, respectively connected to the guide plate and the door locking device to operate the door locking device while rotating when the guide plate rises, and a return spring for returning the rotated rotation plate to the original position is provided on the rotation plate.

Moreover, a stop protrusion limiting the rotation of the rotation plate is formed on the rotation plate, and a select pin, which engages with the stop protrusion, is provided on the cover.

Additionally, a protrusion block protruding towards the guide plate is provided on the rotation plate, and a coupling protrusion, which is coupled to the protruding block, is provided on the guide plate corresponding to the protrusion block, such that the raising and lowering operation of the guide plate is converted into the rotation operation of the rotation plate.

Advantageous Effect

According to an embodiment of the present inventive concept, the push-pull door lock having the anti-panic function, even in the state in which the door locking device of the push-pull door lock is locked, when the user operates the indoor side handle indoors, the locked state of the door locking device is automatically released, so the indoor and outdoor side handles are also released from the locked state to be operated normally. Therefore, the push-pull door lock having the anti-panic function according to an embodiment of the present inventive concept allows people to escape rapidly by swiftly opening the door in emergencies.

DESCRIPTION OF DRAWINGS

FIGS. 7 to 10 illustrate examples of operation states of the indoor side handle device of the push-pull door lock according to the present inventive concept as an example, wherein FIG. 7 is a cross-sectional view illustrating the indoor side handle device when the door is closed, FIG. 8 is an enlarged view in which a body removed from FIG. 7, FIG. 9 is a cross-sectional view illustrating the indoor side handle device when the door is open, and FIG. 10 is an enlarged view in which the body removed from FIG. 9.

MODE FOR INVENTIVE CONCEPT

Hereinafter, preferred embodiments of the present inventive concept will be described in detail with reference to the accompanying drawings.

The terms used in the present inventive concept are defined considering the functions of the present inventive concept. The terms may vary depending on the intention or convention of the user or operator, so the definitions of the terms should be interpreted in accordance with the meanings and concepts consistent with the technical aspects of the present inventive concept.

In addition, the embodiments of the present inventive concept are merely exemplary of the components listed in the claims of the present inventive concept and do not limit the scope of the claims of the present inventive concept. In addition, the embodiments include interchangeable components as equivalent elements in the components listed in the claims throughout the specification.

Furthermore, optional terms in the following embodiments are used to distinguish one component from another component, and the components are not limited by the above terms.

Accordingly, detailed descriptions of relevant prior art that may unnecessarily obscure the essence of the present inventive concept are omitted.

FIGS. 1 to 10 are views illustrating a push-pull door lock having an anti-panic function according to the present inventive concept.

Figure 1:
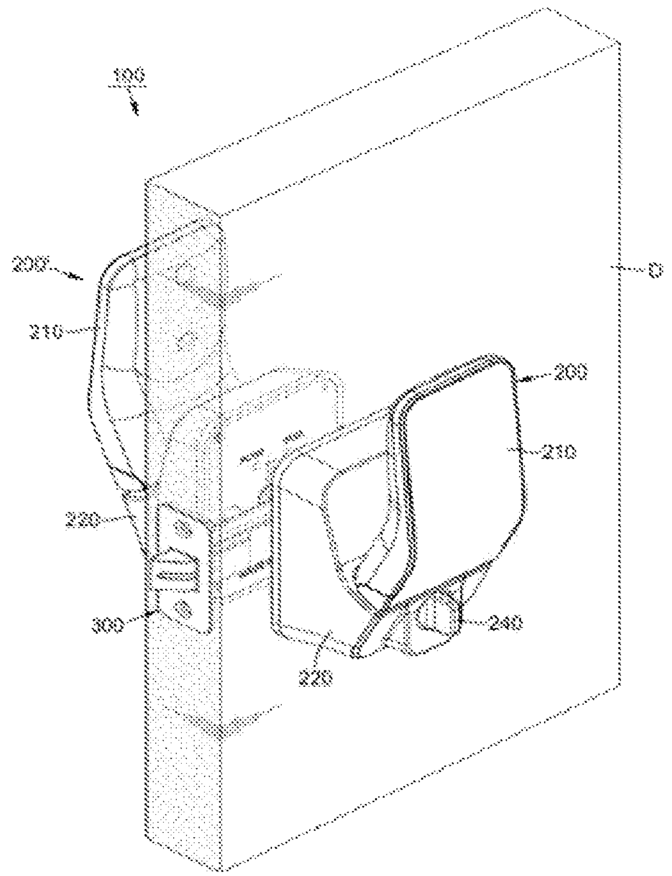
FIG. 1 illustrates an installation state of a push-pull door lock according to the present inventive concept.

As illustrated in FIG. 1, the push-pull door lock 100 according to the present inventive concept includes a door locking device 300 provided on the indoor side of a door D to lock the door, handle devices 200 and 200' provided on the indoor and outdoor sides of the door D respectively, and locking means provided in the handle devices 200 and 200' to lock the operation of a handle and lock the door D.

Specifically, the push-pull door lock 100 as described above is configured to open the door D by pushing or pulling each of the handle devices 200 and 200' provided on the indoor and outdoor sides of the door D according to the opening direction of the door, thereby releasing the locking state of the door locking device 300.

Figure 2:
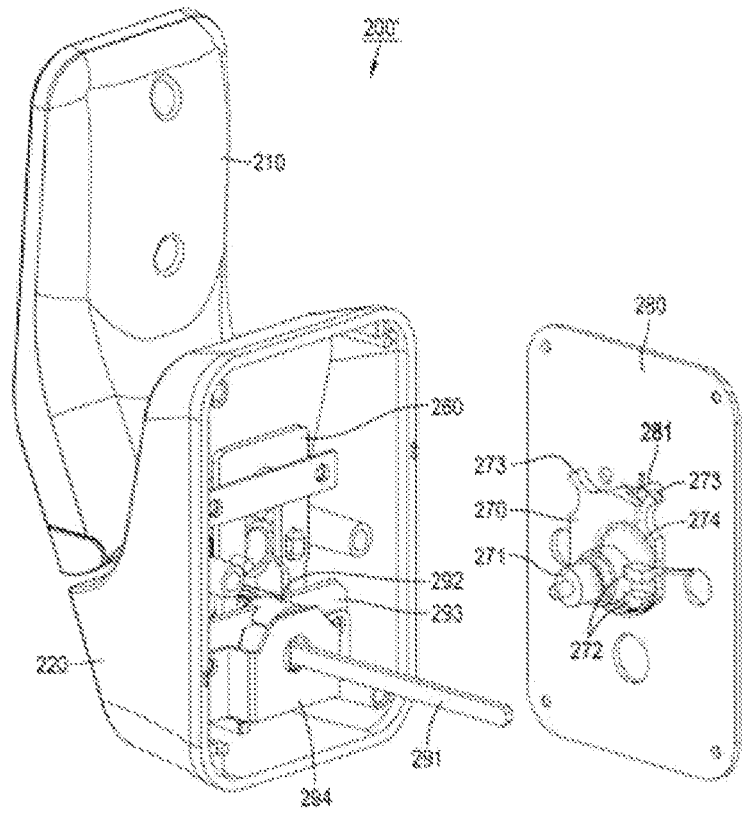
FIG. 2 illustrates an internal structure of an outdoor side handle device of the push-pull door lock of the present inventive concept.
Figure 5:
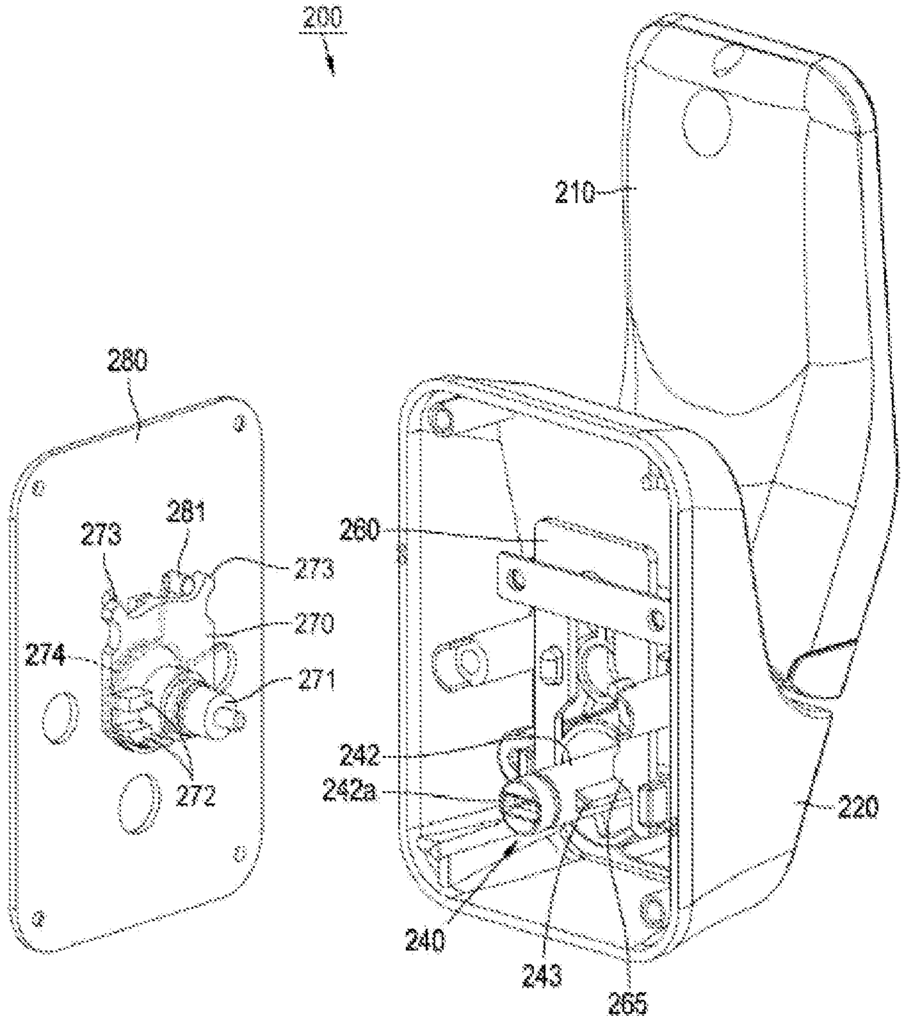
FIG. 5 illustrates an internal structure of an indoor side handle device of the push-pull door lock of the present inventive concept.

As illustrated in FIGS. 2 and 5, the handle devices 200 and 200' include an indoor side handle provided on the indoor side of the door D and an outdoor side handle provided on the outdoor side of the door D, based on the door locking device 300.

The outdoor side handle and the indoor side handle, respectively, have spindles 240 which are provided on sides facing each other and are respectively coupled to both ends of a rotary shaft protruding to both sides of the locking device 300 respectively not to be rotatable, such that the outdoor side handle and the indoor side handle interlock each other through the rotary shaft of the door locking device 300.

Furthermore, the outdoor side handle and the indoor side handle have internal configurations which are symmetrical to each other. The outdoor side handle includes a key assembly 290 and a stopper 293, and the indoor side handle includes a key knob 280 and a coupling bushing 250 operated in conjunction with the key assembly 290.

Therefore, hereinafter, in the following description of the outdoor side handle and the indoor side handle, the handles are collectively called handles 210, and are distinguished between the outdoor side handle and the indoor side handle only regarding the differences between the two handles 210.

Moreover, as illustrated in FIGS. 2 and 5, each of the handle devices 200 and 200' includes: a body 220 coupled and fixed to the door D; and handles 210 which are rotatably provided on the outer side of the body 220 to be operable by pushing or pulling, thereby releasing the locking state of the door locking device 300.

Lower ends of the handles 210 are hinge-coupled to the body 220, and when a user pushes or pulls upper ends of the handles 210, the handles 210 can rotate around a hinge part of the lower end.

Figure 3:
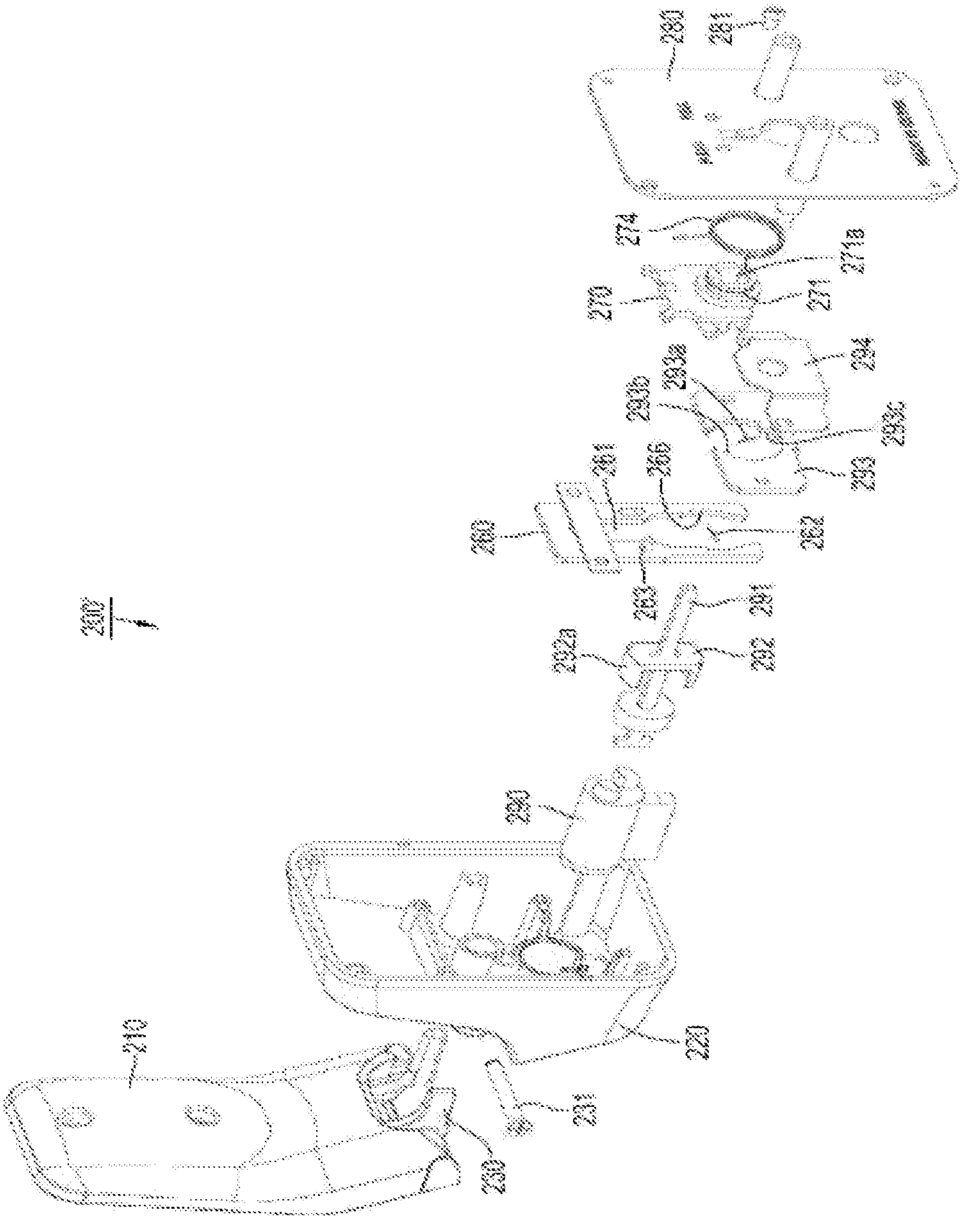
FIG. 3 is an exploded view illustrating the outdoor side handle device of the present inventive concept.
Figure 6:
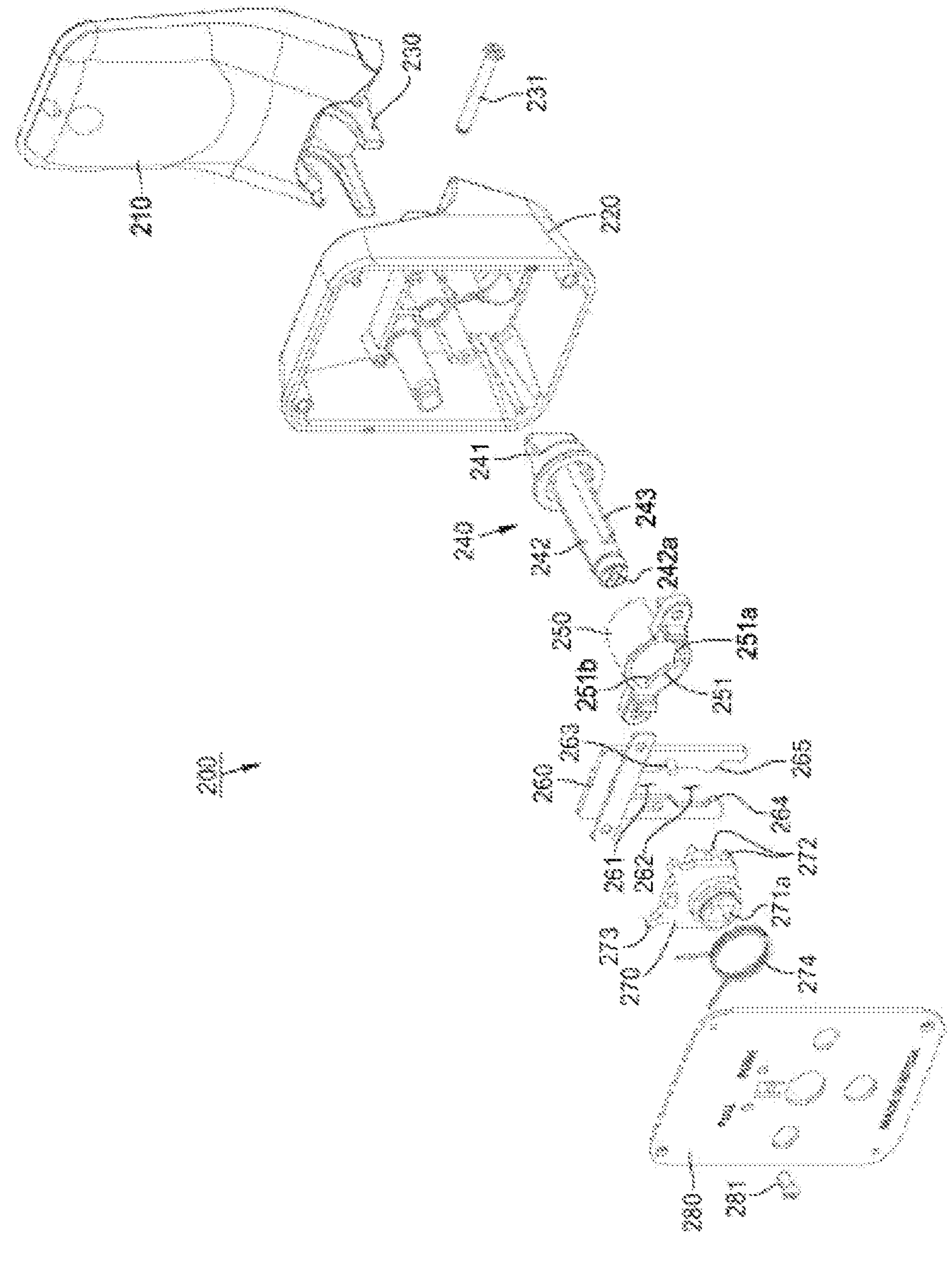
FIG. 6 is an exploded view illustrating the indoor side handle device of the present inventive concept.

Moreover, as illustrated in FIGS. 3 and 6, a hinge shaft 231 which hinge-couples the handles 210 to the body 220 is coupled to the lower ends of the handles 210 while penetrating through the body 220 and the handles 210, and a torsion spring (hereinafter, called "spring") can be fit to the hinge shaft 231, but since the handles 210 rotated by a return spring 274 which will be described later is returned, it may be omitted.

Furthermore, a rotation link 230 in the shape of "L" is inserted into the hinge pin 231, wherein the handle 210 is coupled and fixed to the upper end of the rotation link 230 and a guide plate 260 which is provided inside the body 220 is coupled to the side end of the opposite side.

Thus, when the user pushes or pulls and rotates the handle 210 towards the body 220, the rotation link 230 rotates together with the rotated handle 210 to lift the guide plate 260 positioned within the body 220.

Additionally, as illustrated in FIGS. 3 and 6, the guide plate 260 coupled with the rotation link 230 is provided on the inner side of the body 220 facing the door D to be vertically movable.

The guide plate 260, as illustrated in FIGS. 3 and 6, is a rectangular plate having an area covering the front area of the inner side of the body 220, and is provided with an open bottom through hole.

In this instance, the through hole includes an upper through hole 261 formed on the upper portion of the guide plate 260 and a lower through hole 262 formed on the lower portion of the guide plate 260. The upper through hole 261 and lower through hole 262 are mutually aligned, but the lower through hole 262 is designed to have a larger inner diameter than the upper through hole 261.

This is to provide space for the rotation of a knob shaft 242 of an indoor side handle device 200 and a stopper 292 of an outdoor side handle device 200', which will be described later, to be rotatably provided within the lower through hole 262 and the upper through hole 261, respectively.

Additionally, the guide plate 260 has a coupling protrusion 263, which protrudes on the surface facing the rotation plate 270 to engage with a protrusion block 272 of a rotation plate 270, and enables the lifting operation of the guide plate 260 and the rotational operation of the rotation plate 270 to be interlocked.

Meanwhile, on the lower through hole 262 of the guide plate 260 as described above, there is provided a retaining jaw 264 and a stepped portion 265 for rotating a key knob assembly 240, which will be described later, when the guide plate 260 operates to lift. The retaining jaw 264 and the stepped portion 265 are provided on opposite sides facing each other within the lower through hole 262.

The retaining jaw 264 protrudes inward from the lower portion of the lower through hole 262, and the stepped portion 265 is provided on the opposite side of the lower through hole 262 above the retaining jaw 264, specifically above a rotation protrusion 243 of the key knob assembly 240.

Figure 7:
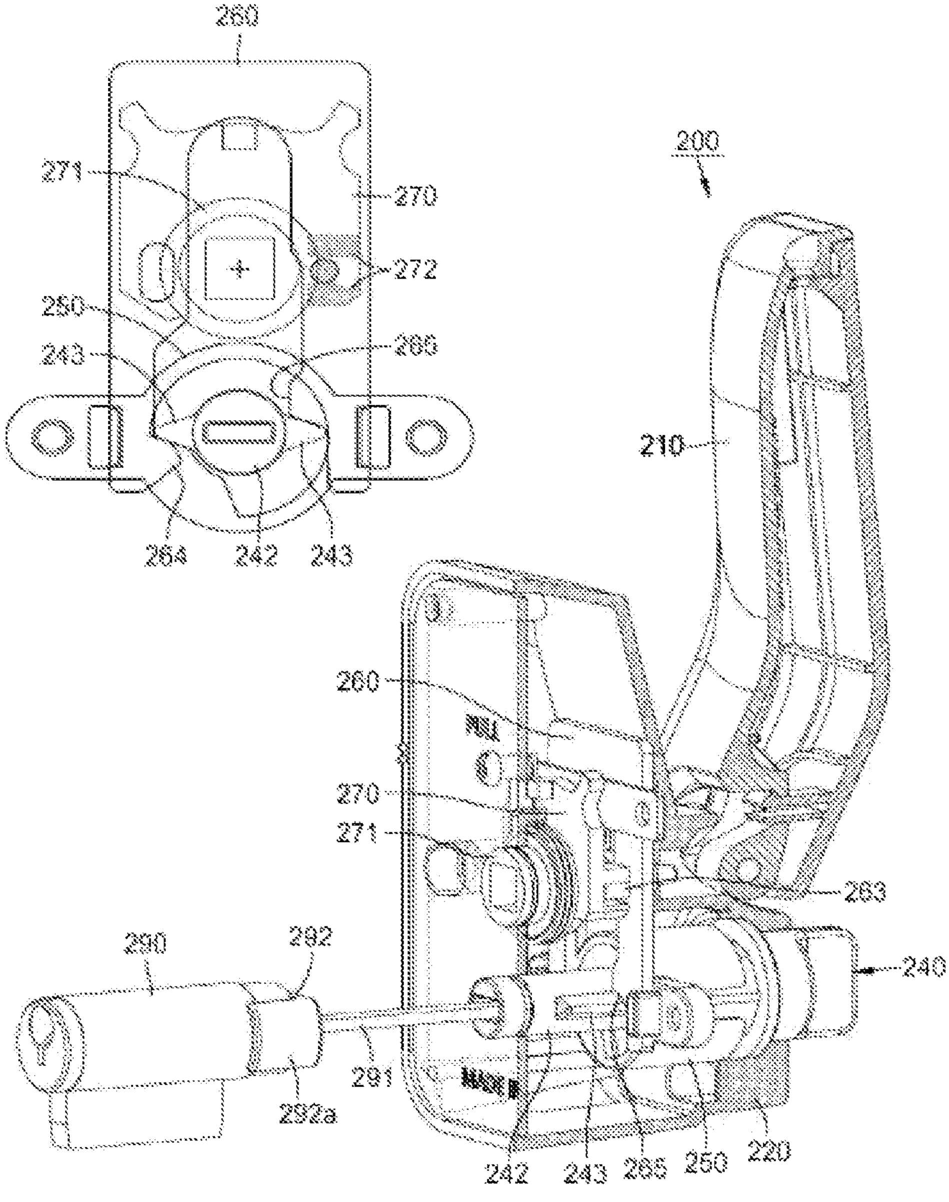
Figure 9:
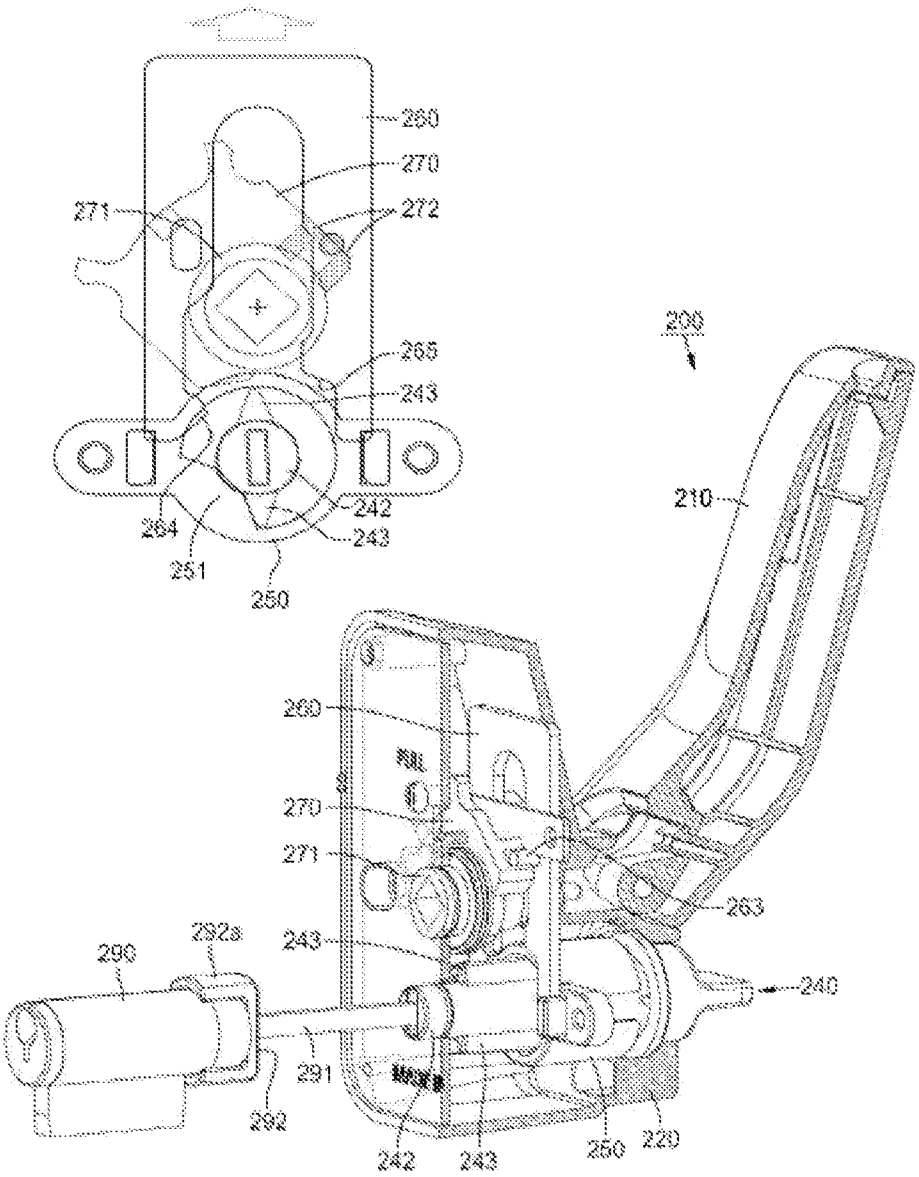

Therefore, as illustrated in the enlarged views in FIGS. 7 and 9, when the guide plate 260 rises, the retaining jaw 264 and the stepped portion 265 enable the key knob assembly 240 to rotate unidirectionally.

In this instance, only one of the retaining jaw 264 and the stepped portion 265 may be configured, but both are provided on the single guide plate 260 to universalize the guide plate 260, thereby enabling the rotation of the key knob assembly 240 regardless of the push-pull operation direction of the indoor side handle 210.

In other words, in a case that the indoor side handle 210 operates as a push type, the guide plate 260 descends to cause the stepped portion 265 to rotate the key knob assembly 240 clockwise, and in a case that the indoor side handle 210 operates as a pull type, the guide plate 260 rises to cause the retaining jaw 264 to rotate the key knob assembly 240 clockwise. FIGS. 7 and 9 illustrate an example of the indoor side handle device 200 among handle devices 200 and 200', showing an indoor side handle 210 operating as a pull type.

Furthermore, laterally expanded retaining jaws 266 are formed in the lower through hole 262 of the guide plate 260 provided in the outdoor side handle device 200', and both sides of the retaining jaws 266 are rounded in an arc shape to correspond to the curved parts **292*a* of the stopper 292**, which will be described later.

Figure 4:
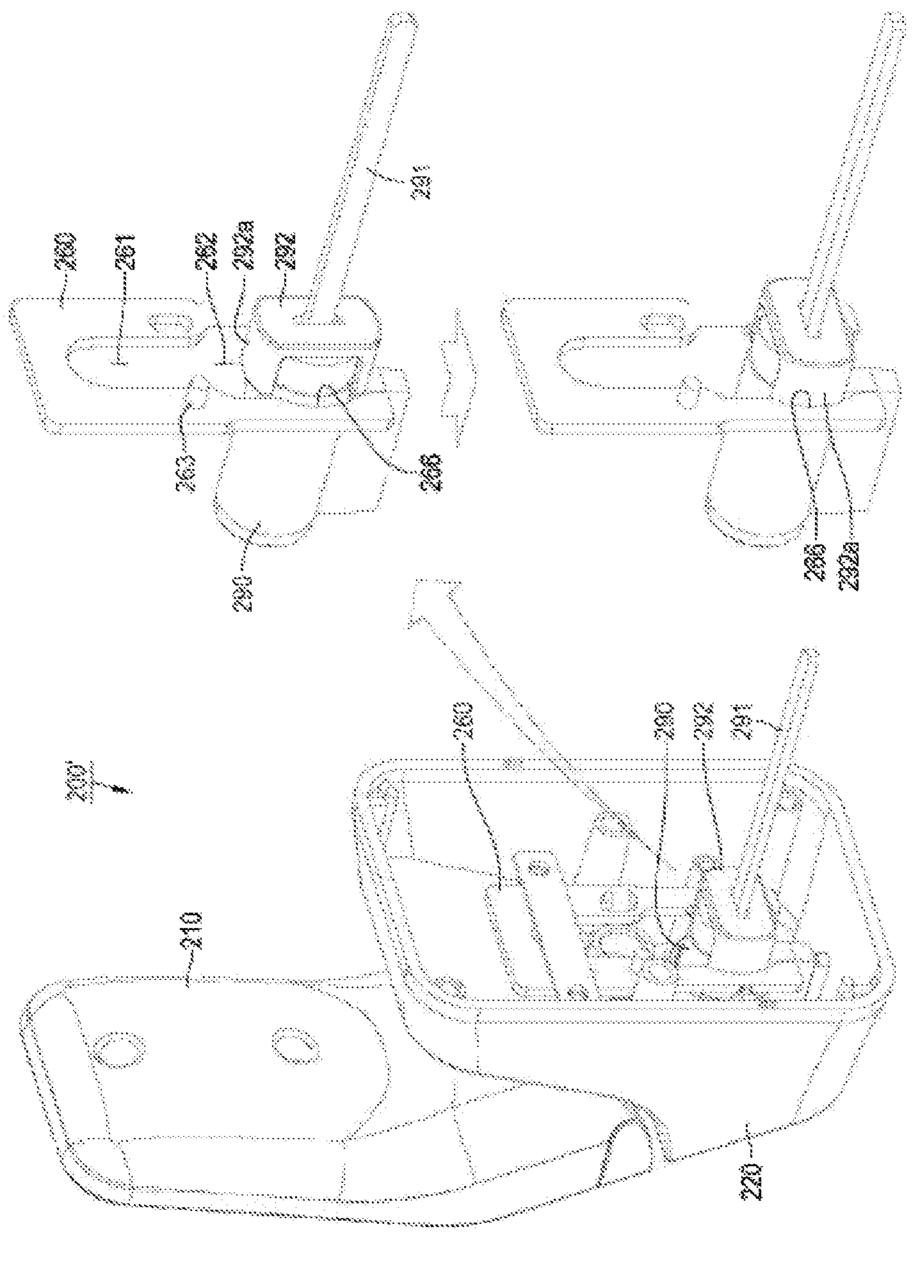
FIG. 4 illustrates a locked state where a stopper and a guide plate are combined in the outdoor side handle device of the present inventive concept.

When the curved parts **292*a* of the stopper 292 are coupled to the retaining jaws 266 as illustrated in FIG. 4, the locking means of the push-pull door lock 100 are locked. Consequently, while the outdoor side handle 210 is locked, the indoor side handle 210** remains operable.

That is, even when the push-pull door lock 100 is locked, the indoor side handle 210 is configured to operate to provide an anti-panic function that allows a person inside to easily open the door D in emergencies and evacuate quickly. Detailed description regarding the anti-panic function will be provided in the description of the locking means, which will described later.

Meanwhile, a cover 280 in the form of a plate for finishing the body 220 is provided on the body 220, and a rotation plate 270 is rotatably provided on one side of the cover 280, facing the interior of the body 220.

The rotation plate 270 has a spindle 271 formed in its center, and a square-shaped insertion groove **271*a* that penetrates the cover 280, and is engaged with and matched to the rotation axis of the door lock 300 to prevent relative rotation is formed at the end of the spindle 271**.

Moreover, on one side of the rotation plate 270, protrusion blocks 272 are formed. Each of the protrusion blocks 272 has a pair of protrusion plates spaced apart vertically. As a result, when the coupling protrusions 263 of the guide plate 260 are inserted and coupled between the upper and lower protrusion blocks 272, the lifting operation of the guide plate 260 is converted into the rotational operation of the rotation plate 270.

Furthermore, at the top of the rotation plate 270, stop protrusions 273 protruding to restrict the rotation of the rotation plate 270 are formed. The stop protrusions 273 are formed at regular intervals from the top of the rotation plate 270, thereby ensuring that the rotation plate 270 is always properly positioned when it returns to its original position.

Meanwhile, a select pin 281 is provided on the cover 280 to engage with the stop protrusions 273 of the rotation plate 270. Depending on whether the select pin 281 is provided on the left or right side of the cover 280, the push-pull direction of the handle 210 can be switched.

In other words, as illustrated in FIGS. 7 and 9, when the handle 210 is pulled, the rotation plate 270 rotates clockwise when viewed from the handle 210, and when the handle 210 is pushed, the rotation plate 270 rotates counterclockwise. Therefore, the push-pull direction of the handle 210 is determined by the position of the select pin 281.

Furthermore, between the rotation plate 270 and the cover 280, a return spring 274 is provided to compress and then return the rotated rotation plate 270 to its original position. The return spring 274 is a torsion spring, with one end fixed to the cover 280 and the other end fixed to the rotation plate 270.

Meanwhile, the locking means is configured to forcibly stop the lifting operation of the guide plate 260 of the handle devices 200 and 200' described above, thereby locking the operation of the push-pull door lock 100.

In other words, as illustrated in FIGS. 3 and 6, the locking means include the key knob assembly 240 provided on the body 220 of the indoor side handle device 200 and the key assembly 290 provided on the body 220 of the outdoor side handle device 200'.

The key knob assembly 240 includes a knob 241 rotatably provided on the indoor side body 220, a knob shaft 242 protruding inwardly from the key knob 241 into the body 220, and the rotation protrusion 243 protruding from both sides of the key knob shaft 242.

When the key knob 241 is rotated on the indoor side body 220, the present inventive concept can lock the operation of the push-pull door lock 100 from the inside.

Additionally, the key knob shaft 242 at the front end of the key knob 241 protrudes inward into the body 220, and is sequentially provided through a coupling bushing 250 and a lower through hole 262 of the guide plate 260, and an insertion groove 242*a* is formed on the front surface thereof so that the locking shaft 291 of the key assembly 290, which will be described later, is inserted and coupled into the insertion groove. The insertion groove 242*a* is rectangular in shape and is engaged with the locking shaft 291 to rotate together.

Moreover, the rotation protrusions 243 are symmetrically formed on both sides of the key knob shaft 242, wherein the rotation protrusion 243 of one side is located on the upper side of the retaining jaw 264 of the guide plate 260 and the rotation protrusion 243 of the other side is located on the lower side of the stepped portion 265 of the guide plate 260.

Therefore, in the state in which the rotation protrusions 243 of the key knob shaft 242 are positioned on both sides, since the rotation protrusions 243 are respectively in contact with the retaining jaw 264 and the stepped portion 265 of the guide plate 260, when the guide plate 260 rises, the key knob 241 and the key knob shaft 242 rotate unidirectionally, and the rotation protrusions 243 of the rotated knob shaft 242 are positioned vertically. In this state, the locking of the locking means, namely the key knob assembly 240, is released, and the guide plate 260 operates independently of the key knob assembly 240.

Furthermore, between the indoor side body 220 and the guide plate 260, a coupling bushing 250 through which the key knob shaft 242 penetrates is provided, and a retaining protrusion 251 is provided at the front of the coupling bushing 250 to limit the rotation of the key knob shaft 242 to 90 degrees.

The retaining protrusion 251 is formed in a rounded shape protruding into one quadrant area when the front of the coupling bushing 250 is divided into quadrants. In this exemplary embodiment, as illustrated in FIG. 6, it is formed in the area corresponding to the third quadrant, so the ends of the retaining protrusion 251 are formed as a lower retaining jaw 251*a* and a lateral retaining jaw 251*b*.

Therefore, in the state in which the rotation protrusions 243 of the key knob shaft 242 are positioned horizontally, the rotation protrusion 243 of one side is engaged with the lateral retaining jaw 251*b* of the coupling bushing 250, and in the state in which the rotation protrusions 243 of the key knob shaft 242 are positioned vertically after rotation, the rotation protrusion 243 of the other side is engaged with the lower retaining jaw 251*a* of the coupling bushing 250, thereby ensuring that the key knob shaft 242 and the key knob 241 of the key knob assembly 240 always rotate only 90 degrees.

Meanwhile, the key assembly 290 is rotatably provided on the outdoor side body 220. When the user puts the key in the key assembly 290 and rotates the key assembly 290 outdoors, the present inventive concept can lock the operation of the push-pull door lock 100 outdoors.

The key assembly 290 is provided rotatably on the outdoor side body 220, as illustrated in FIGS. 3 and 4, and a square bar-shaped locking shaft 291 is coupled to the front end thereof. The locking shaft 291 is coupled to the insertion groove 242*a* formed on the key knob shaft 242 of the key knob assembly 240 prevents in a manner that relative rotation, thereby coordinating the operation of the key knob assembly 240 and the key assembly 290.

In addition, the stopper 292 is coupled to the locking shaft 291 in a manner that prevents relative rotation, and the stopper 292 is coupled in a state penetrating the lower through hole 262 of the guide plate 260.

The stopper 292 is longitudinally rectangular, and both ends in the longitudinal direction are formed as rounded protrusions 292*a* having the same circumferential surface as the arc formed when the stopper 292 rotates. In the middle portion of the stopper 292, a square-shaped coupling hole corresponding to the locking shaft 291 of the key assembly 290 is formed to be coupled in shape, such that the stopper 292 is also rotated integrally when the locking shaft 291 rotates.

Therefore, when the stopper 292 rotates, the rounded protrusions 292*a* formed at the long end parts of the stopper 292 rotate 90 degrees, so as to be in intimate contact with the corresponding shape of the retaining jaw 266 of the guide plate 260, thereby allowing smooth rotation of the stopper 292 without interference due to the shape of the rounded protrusions 292*a* and the retaining jaw 266. Moreover, since the lifting operation of the guide plate 260 is blocked by the intimate contact of the rounded protrusions 292*a* and the retaining jaw 266, the operation of the push-pull door lock 100 can be locked.

Meanwhile, since the outdoor side guide plate 260 constrained by the stopper 292 as described above cannot be lifted and lowered, the outdoor side handle 210 is locked, so the user cannot open the door D outdoors. However, the rotation protrusions 243 of the key knob assembly 240, which are rotated together with the stopper 292, are positioned at right and left sides to be in contact with the retaining jaw 264 and the stepped portion 265 of the guide plate 260. In this state, when the indoor side handle 210 is operated, the indoor side guide plate 260 is lifted to rotate the key knob shaft 242 of the key knob assembly 240 without manipulating the key knob 241 indoors. With just the operation of the indoor handle 210, the lock of the push-pull door lock 100 is released to open the door D, thus providing an anti-panic function.

Furthermore, the outdoor handle device 200' includes a stop plate 293 that restricts the rotation of the stopper 292 to 90 degrees between the guide plate 260 and the rotation plate 270. The stop plate 293 has a through hole 293*a* formed for the stopper 292 to rotate through, and the inner surface of the through hole 293*a* is provided with a retaining jaw with which the stopper 292 is in contact to be coupled.

The retaining jaw includes an upper retaining jaw 293*b* formed at the upper portion of the inner surface of the through hole 293*a* and a side retaining jaw 293*c* formed at the side to limit the rotation of the stopper 292 to 90 degrees.

The stop plate 293 is fixedly coupled to the outdoor side body 220, and a cover plate 294 covering the stopper 292 is fixedly coupled to the outer surface of the stop plate 293.

The operational relationship of the push-pull door lock according to the present inventive concept will be described as follows.

Figure 10:
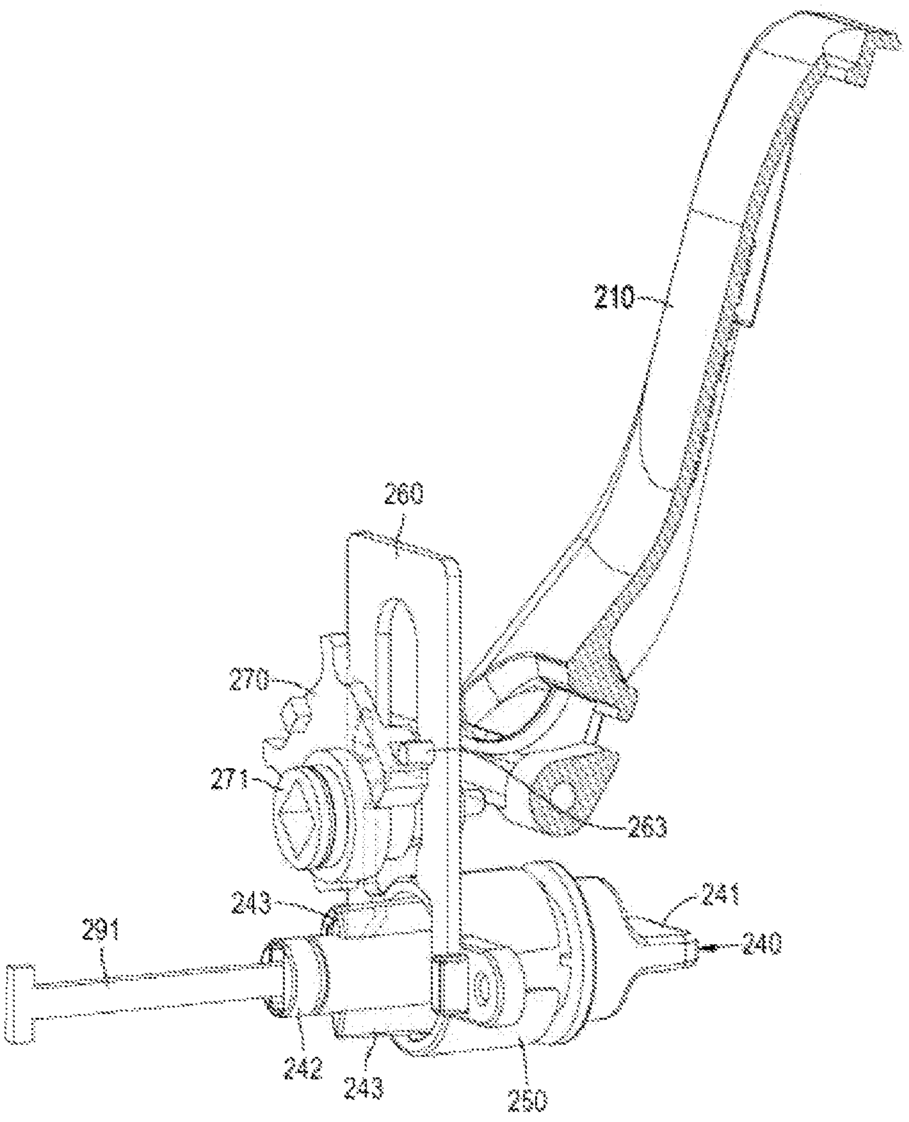

First, FIGS. 9 and 10 illustrate an example of the indoor side handle device 200 installed indoors, demonstrating the operation of the indoor side handle 210 being pulled to open the door D. However, the indoor side handle 210 could also be installed to push and open the door D.

When the indoor side handle 210 is pulled to open the door D, as illustrated in FIGS. 9 and 10, the indoor side handle 210 rotates along with the rotation link 230, and the guide plate 260 connected to the rotation link 230 moves upward within the indoor side body 220.

As a result, the rotation protrusions 243 of the key knob assembly 240, which were coupled with the retaining jaw 264 of the guide plate 260, rotate clockwise as the guide plate 260 rises, and the rotation protrusions 243 of the rotated knob assembly 240 move up and down, thereby releasing the lock of the locking means.

In addition, as the guide plate 260 rises, the rotation plate 270 rotates counterclockwise relative to the front view of FIG. 9, and as the rotating shaft of the door lock device 300 coupled to the spindle 271 of the rotation plate 270 rotates, the door D opens.

The opening operation of the door D described above is also performed by the outdoor side handle device 200' in the same manner as the indoor side handle device 200, so repeated descriptions thereof will be omitted.

Figure 8:
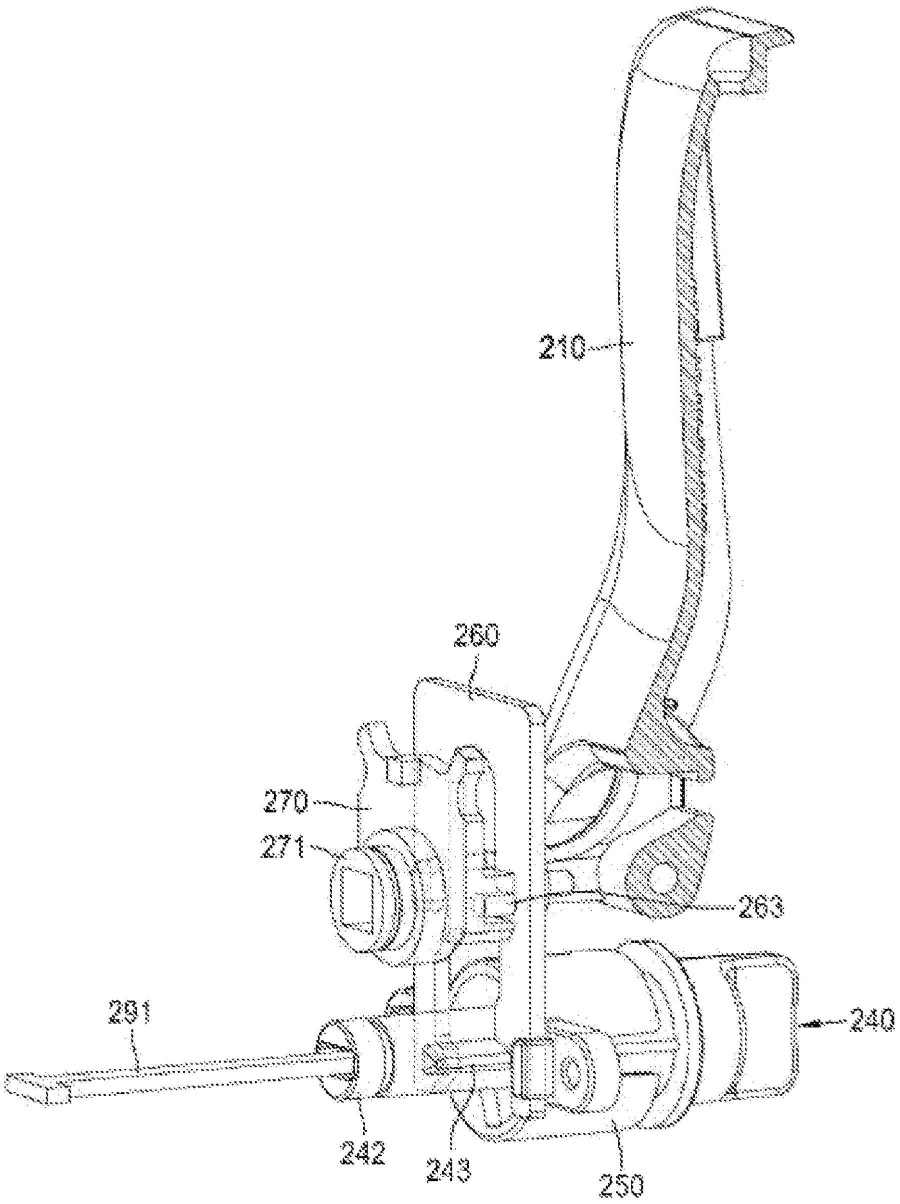

Meanwhile, when the key knob 241 of the key knob assembly 240 is rotated indoors or a key is coupled and rotated to the key assembly 290 outdoors, the locking shaft 291 is rotated by the rotation of the key knob 241 or the key assembly 290. Consequently, as the locking shaft 291 rotates, the coupled stopper 292 also rotates as illustrated in FIGS. 7 and 8.

That is, the curved parts 292*a*, formed on both ends of the long part, of the rotated stopper 292 are located on both right and left sides within the lower through hole 262 of the outdoor side guide plate 260, thereby engaging the stopper 292 in the retaining jaw 266 in a surface contact state.

Thus, since the stopper 292 is engaged to the retaining groove 266 of the outdoor side guide plate 260, the outdoor side guide plate 260 becomes locked, and consequently, the outdoor side handle 210 remains in a locked state.

However, even in this state, the indoor handle device 200 operates normally. When the stopper 292 is coupled to the retaining groove 266 of the outdoor side guide plate 260, the rotation protrusions 243 of the key knob assembly 240 rotated together with the stopper 292 are located at the right and left sides to be in contact with the retaining jaw 264 and the stepped portion 265 of the guide plate 260. However, in this state, when the user pulls the indoor side handle 260 to operate, the indoor side guide plate 260 rises and the rotation protrusion 243 contacting the indoor side guide plate 260 is rotated, so the key knob assembly 240 is rotated by 90 degrees and the coupled locking shaft 291 is also rotated by 90 degrees to rotate the coupled stopper 292 by 90 degrees.

As a result, the stopper 292 rotated by 90 degrees moves up and down within the lower through hole 262 as its curved parts 292*a* disengages from the retaining jaw 266 of the outdoor side guide plate 260, thereby releasing the lock of the door lock device 300 and enabling both indoor and outdoor side handle devices 200 and 200' to operate normally.

Thus, in the present inventive concept, the locking state of the door lock device 300 can be released by simply operating the indoor handle 210 without manipulating the key knob 241 of the indoor side handle device 200, thereby allowing for swift evacuation by opening the door D in emergencies.

Although the present inventive concept has been described in detail with reference to specific embodiments, it is to be understood that the inventive concept is not limited thereto. Those skilled in the art will recognize that various modifications and improvements can be made within the scope of the present inventive concept, as defined by the appended claims.

Simple modifications or changes to the present inventive concept all fall within the scope of the inventive concept, and the specific protection scope of the present inventive concept will be clarified by the appended claims.

SEQUENCE LIST TEXT

100: push-pull door lock 200, 200': handle device
210: handle 220: body
230: rotation link 231: hinge shaft
240: key knob assembly 241: key knob
242: knob shaft 243: rotation protrusion
250: coupling bushing 251: retaining protrusion
251*a*: lower retaining jaw 251*b*: side retaining jaw
260: guide plate 261: upper through hole
262: lower through hole 263: coupling protrusion
264: retaining jaw 265: stepped portion
266: retaining groove 270: rotation plate
271: spindle 271*a*: insertion groove
272: protrusion block 273: stop protrusion
274: return spring 280: cover
281: select pin 290: key assembly
292: locking shaft 293: stopper
293*a*: curved part 294: guide plate
294*a*: upper retaining jaw 294*b*: side retaining jaw
295: cover plate 300: locking device

The invention claimed is:

1. A push-pull door lock having an anti-panic function, comprising:

a door locking device which is provided inside a door to open and close the door; a handle device which includes bodies fixedly provided on the indoor side and the outdoor side of the door, and handles which are respectively provided on the bodies to be pushed or pulled; and a locking means which is provided in each of the bodies of the handle device and locks the operation of the handle to lock the door, wherein the locking means comprises:

a key knob assembly which is rotatably provided in the indoor side body, the key knob assembly including:

a key knob rotatably provided on the indoor side body;

a knob shaft protruding inwardly from the key knob into the body, the knob shaft having an outer circumferential surface, and rotation protrusions protruding from both sides of the outer circumferential surface of the knob shaft;

a key assembly which is rotatably provided in the outdoor side body and is connected to the key knob assembly to be rotated along with the key knob assembly;

a locking shaft having a bar shape, mechanically connecting the key assembly and the key knob assembly such that the key assembly and the key knob assembly are rotated together; and a stopper which is coupled to the locking shaft to be rotated along with the locking shaft, and locks the operation of the handle, wherein the locking means includes guide plates which are respectively provided on the indoor side and outdoor side bodies and are moved up and down on the bodies by push and pull operations of the indoor side and outdoor side handles, wherein the outdoor side guide plate has a through-hole through which the stopper passes to be rotatable and to which the stopper is coupled after being rotated so as to stop the moving-up/down operation of the outdoor side guide plate during locking of the locking means, wherein the indoor side guide plate has a through-hole through which the knob shaft passes, the knob shaft extending through the through-hole of the indoor side guide plate, the through-hole of the indoor side guide plate having a retaining jaw or a stepped portion formed on an inner surface thereof, and wherein the key knob assembly passes through the indoor side guide plate to be rotatable, and wherein the push-pull door lock is configured such that, when the indoor side guide plate is moved up or down by operation of the indoor side handle, the retaining jaw or the stepped portion abuts against and cams the rotation protrusions on the knob shaft to rotate the key knob assembly about an axis of the knob shaft, thereby rotating the locking shaft, and thereby rotating the stopper to release the locking of the outdoor side guide plate.

2. The push-pull door lock according to claim 1, wherein the stopper is rectangular in shape, and has curved parts formed on both sides in the longitudinal direction and having the same circumferential surface as the arc formed during rotation of the stopper, and wherein the through hole of the outdoor guide plate has a retaining jaw which is formed to expand in one direction and has an arc formed on the inner circumferential surface thereof to correspond to the curved part, such that the curved part of the stopper are in surface contact and engaged with the retaining jaw of the outdoor side guide plate when the locking means is locked.

3. The push-pull door lock according to claim 1, wherein the indoor handle device includes a coupling bushing coupled to the key knob assembly, and a retaining protrusion limiting the rotation of the key knob assembly to 90 degrees is formed on the coupling bushing.

4. The push-pull door lock according to claim 1, wherein rotation plates are provided on the body to be rotatable, respectively connected to the guide plate and the door locking device to operate the door locking device while rotating when the guide plate rises, and a return spring for returning the rotated rotation plate to the original position is provided on the rotation plate.

5. The push-pull door lock according to claim 4, wherein a stop protrusion limiting the rotation of the rotation plate is formed on the rotation plate, and a select pin, which engages with the stop protrusion, is provided on a cover.

6. The push-pull door lock according to claim 4, wherein a protrusion block protruding towards the guide plate is provided on the rotation plate, and a coupling protrusion, which is coupled to the protruding block, is provided on the guide plate corresponding to the protrusion block, such that the raising and lowering operation of the guide plate is converted into the rotation operation of the rotation plate.

* * * * *